(12) United States Patent
Dreher et al.

(10) Patent No.: US 12,252,570 B2
(45) Date of Patent: Mar. 18, 2025

(54) CORE-SHELL FLOW IMPROVER

(71) Applicant: Liquidpower Specialty Products Inc., Houston, TX (US)

(72) Inventors: Wayne R. Dreher, Germantown, TN (US); Kenneth W. Smith, Tonkawa, OK (US); Stuart N. Milligan, Ponca City, OK (US); Timothy L. Burden, Ponca City, OK (US); William F. Harris, Palm Harbor, FL (US); Ray L. Johnston, Ponca City, OK (US); Wolfgang Klesse, Aschaffenburg (DE); Gerold Schmitt, Aschaffenburg (DE); John Wey, East Brunswick, NJ (US)

(73) Assignee: LiquidPower Specialty Products Inc., Houston, TX (US)

( * ) Notice: Subject to any disclaimer, the term of this patent is extended or adjusted under 35 U.S.C. 154(b) by 869 days.

(21) Appl. No.: 17/319,669

(22) Filed: May 13, 2021

(65) Prior Publication Data
US 2021/0261707 A1   Aug. 26, 2021

Related U.S. Application Data

(60) Division of application No. 15/210,918, filed on Jul. 15, 2016, now Pat. No. 11,028,210, which is a continuation of application No. 12/031,290, filed on Feb. 14, 2008, now abandoned.

(51) Int. Cl.
| | | |
|---|---|---|
| C08F 265/06 | (2006.01) | |
| C08F 2/00 | (2006.01) | |
| C08F 2/22 | (2006.01) | |
| C08F 265/04 | (2006.01) | |
| C08L 51/00 | (2006.01) | |
| F17D 1/17 | (2006.01) | |

(52) U.S. Cl.
CPC ............ *C08F 265/06* (2013.01); *C08F 2/002* (2013.01); *C08F 2/22* (2013.01); *C08F 265/04* (2013.01); *C08L 51/003* (2013.01); *F17D 1/17* (2013.01)

(58) Field of Classification Search
None
See application file for complete search history.

(56) References Cited

U.S. PATENT DOCUMENTS

| | | |
|---|---|---|
| 3,493,000 A | 2/1970 | Canevari et al. |
| 3,654,994 A | 4/1972 | Slagel et al. |
| 3,661,541 A | 5/1972 | Hollyday, Jr. |
| 3,679,582 A | 7/1972 | Wagenaar et al. |
| 3,726,653 A | 4/1973 | Van der Meij et al. |
| 3,748,266 A | 7/1973 | Malone et al. |
| 3,758,406 A | 9/1973 | Malone et al. |
| 3,857,402 A | 12/1974 | Schuh |
| 3,985,703 A | 10/1976 | Ferry et al. |
| 4,016,894 A * | 4/1977 | Baldwin ............... F17D 1/16 252/384 |
| 4,546,784 A | 10/1985 | Schulz et al. |
| 4,573,488 A | 3/1986 | Carville et al. |
| 4,640,945 A | 2/1987 | Peiffer et al. |
| 4,670,501 A | 6/1987 | Dymond et al. |
| 4,693,321 A | 9/1987 | Royer |
| 4,881,566 A | 11/1989 | Ubels et al. |
| 4,983,186 A | 1/1991 | Naiman et al. |
| 5,080,121 A | 1/1992 | Malik et al. |
| 5,096,603 A | 3/1992 | Peiffer et al. |
| 5,110,874 A | 5/1992 | Naiman et al. |
| 5,504,131 A | 4/1996 | Smith et al. |
| 5,928,830 A | 7/1999 | Cheng et al. |
| 6,126,872 A | 10/2000 | Kommareddi et al. |
| 6,160,036 A | 12/2000 | Kommareddi et al. |
| 6,178,980 B1 | 1/2001 | Storm |
| 6,218,490 B1 | 4/2001 | Brunelli et al. |
| 6,723,683 B2 | 4/2004 | Crossman et al. |
| 6,723,779 B2 | 4/2004 | Drujon et al. |
| 6,765,053 B2 | 7/2004 | Abude et al. |
| 6,838,418 B2 | 1/2005 | Allan et al. |
| 6,841,593 B2 | 1/2005 | Kommareddi et al. |
| 6,851,444 B1 | 2/2005 | Kohl et al. |
| 6,894,088 B2 | 5/2005 | Motier et al. |
| 2002/0065352 A1 | 5/2002 | Johnston et al. |
| 2003/0013783 A1 | 1/2003 | Kommareddi et al. |
| 2004/0060703 A1 | 4/2004 | Stegemeier et al. |
| 2005/0049327 A1 | 3/2005 | Jovancicevic et al. |
| 2005/0209368 A1 | 9/2005 | Yang et al. |
| 2006/0144595 A1 | 7/2006 | Milligan et al. |

(Continued)

FOREIGN PATENT DOCUMENTS

| | | |
|---|---|---|
| EP | 0398576 A2 | 11/1990 |
| GB | 1 437 132 A | 5/1976 |

(Continued)

OTHER PUBLICATIONS

Entsiklopedia Polymerov Moscow; Bolshaya Rossiiskaya Entsiklopedia; vol. 3; dated 1992; 2 total pages.
Indian Office Action for Application No. 5535/DELNP/2010 dated January 19, 2017.
Chinese Office Action (with attached English translation) for Application No. 201610183141.0; dated Mar. 27, 2017; 13 total pages.
Eurasian Office Action (with attached English translation) for Application No. 201070960; dated Mar. 28, 2017; 6 total pages.

(Continued)

*Primary Examiner* — Robert T Butcher
(74) *Attorney, Agent, or Firm* — Patterson + Sheridan, LLP

(57) ABSTRACT

A flow improver comprising a plurality of core-shell particles that can be formed by emulsion polymerization. The core of the core-shell particles can include a drag reducing polymer, while the shell of the particles can include repeat units of a hydrophobic compound and an amphiphilic compound. The flow improver can demonstrate increased pumping stability over conventionally prepared latex flow improvers.

17 Claims, 3 Drawing Sheets

(56) References Cited

U.S. PATENT DOCUMENTS

| | | | |
|---|---|---|---|
| 2006/0148928 A1 | 7/2006 | Harris et al. | |
| 2007/0224899 A1* | 9/2007 | Dungworth | D01F 1/10 |
| | | | 523/202 |
| 2008/0023071 A1 | 1/2008 | Smith et al. | |
| 2008/0058473 A1* | 3/2008 | Freidzon | C08F 265/04 |
| | | | 525/191 |

FOREIGN PATENT DOCUMENTS

| | | |
|---|---|---|
| WO | 99/57162 A1 | 11/1999 |
| WO | 2008014190 A2 | 1/2008 |

OTHER PUBLICATIONS

Chinese Office Action (with attached English translation) for Application No. 201610183141.0; dated Feb. 23, 2018; 9 total pages.
Chinese Office Action (with attached English translation) for Application No. 201610183141.0; dated Sep. 20, 2018; 11 total pages.

* cited by examiner

CORE-SHELL FLOW IMPROVER

CROSS-REFERENCE TO RELATED APPLICATIONS

This application is a divisional of U.S. patent application Ser. No. 15,210,918, filed Jul. 15, 2016, which is a continuation of U.S. patent application Ser. No. 12/031,290, filed Feb. 14, 2008, now abandoned, both of which are herein incorporated by reference in their entireties.

BACKGROUND OF THE INVENTION

Field of the Invention

The present invention relates generally to flow improving compositions. In another aspect, the present invention relates to flow improvers comprising a plurality of polymeric core-shell particles.

Description of the Prior Art

In general, fluids transported via pipeline experience a reduction in fluid pressure over the length of the pipeline due to frictional energy losses. This problem is particularly evident in pipelines spanning long distances, such as those transporting crude oil and other liquid hydrocarbon products. In part, these frictional losses are caused by the formation of turbulent eddies within the fluid. To overcome these losses, pipelines employ one or more pumps to increase the pressure of the fluid and achieve a desired fluid flow rate through the pipe. As demand for fluids transported via pipeline (e.g., crude oil and refined products such as gasoline and diesel) increases, the flow rate and, correspondingly, the pipeline pumping pressure must increase. However, design limitations (e.g., size and pressure rating) often limit throughput of existing pipelines and building new or upgrading existing pipelines is often very labor-intensive and expensive.

One common solution for increasing the fluid throughput of a pipeline without altering its pressure is to employ a flow improving composition (i.e., a flow improver). Typically, flow improvers comprise one or more drag reducing agents (i.e., drag reducers) that are capable of reducing the friction losses by suppressing eddy formation. As a result, higher fluid flow rates are achievable at a constant pumping pressure. Typically, the drag reducers employed in flow improving compositions comprise ultra-high molecular weight polymers. Polymeric drag reducing agents can be particularly advantageous for use in hydrocarbon-containing fluids.

In general, polymeric drag reducers can be produced according to several polymerization techniques, such as bulk polymerization, emulsion polymerization, interfacial polymerization, suspension polymerization, and/or rotating disk or coacervation processes. Consequently, the resulting flow improver can take a variety of physical forms, including, for example, slurries, gels, emulsions, colloids, and solutions.

Colloidal (i.e., latex) flow improvers are one example of flow improvers comprising polymeric drag reducing particles. Typically, latex flow improvers are introduced into pipelines used for transporting hydrocarbon-containing liquids via a high pressure injection pump. As the latex flow improver passes through the internals of the injection pump, at least a portion of the surfactant molecules associated with the polymeric latex particles can be sheared off, exposing the surface of the polymer and causing the latex particles to agglomerate. As a result, a polymeric film forms on internals of the pump and on downstream process equipment (e.g., valves, pipe, etc.), thereby causing a reduction in the pipeline system's efficiency. As the pipeline efficiency diminishes, the system operating and maintenance costs increase, while pipeline throughput declines.

SUMMARY OF THE INVENTION

In one embodiment of the present invention, there is provided a flow improver comprising solid particles having a polymeric core and a polymeric shell at least partly surrounding the core. The core comprises a drag reducing polymer, while the shell comprises a shell copolymer having repeat units of a hydrophobic compound and repeat units of an amphiphilic compound.

In another embodiment of the present invention, there is provided a latex flow improver comprising an aqueous continuous phase and a plurality of polymeric particles dispersed in the continuous phase. The polymeric particles comprise a core and a shell at least partly surrounding the core. The core comprises a drag reducing polymer formed by emulsion polymerization. The shell is formed around the core by emulsion polymerizing at least one hydrophobic monomer and at least one polymerizable surfactant in the presence of the core.

In yet another embodiment of the present invention, there is provided a process for making a flow improver comprising: (a) forming a plurality of core particles of a drag reducing polymer by emulsion polymerization; and (b) forming shells around at least a portion of the core particles by emulsion polymerization to thereby produce a plurality of core-shell particles.

In still another embodiment of the present invention, there is provided a process for reducing pressure loss associated with the turbulent flow of a fluid through a conduit. The process comprises using a pump to inject a flow improver into the fluid flowing through the conduit, where the flow improver comprises solid particles having a polymeric core and a polymeric shell at least partly surrounding the core. The core of the solid particles comprises a drag reducing polymer, while the shell comprises a shell copolymer having repeat units of a hydrophobic compound and repeat units of an amphiphilic compound.

DETAILED DESCRIPTION

Figure 1:
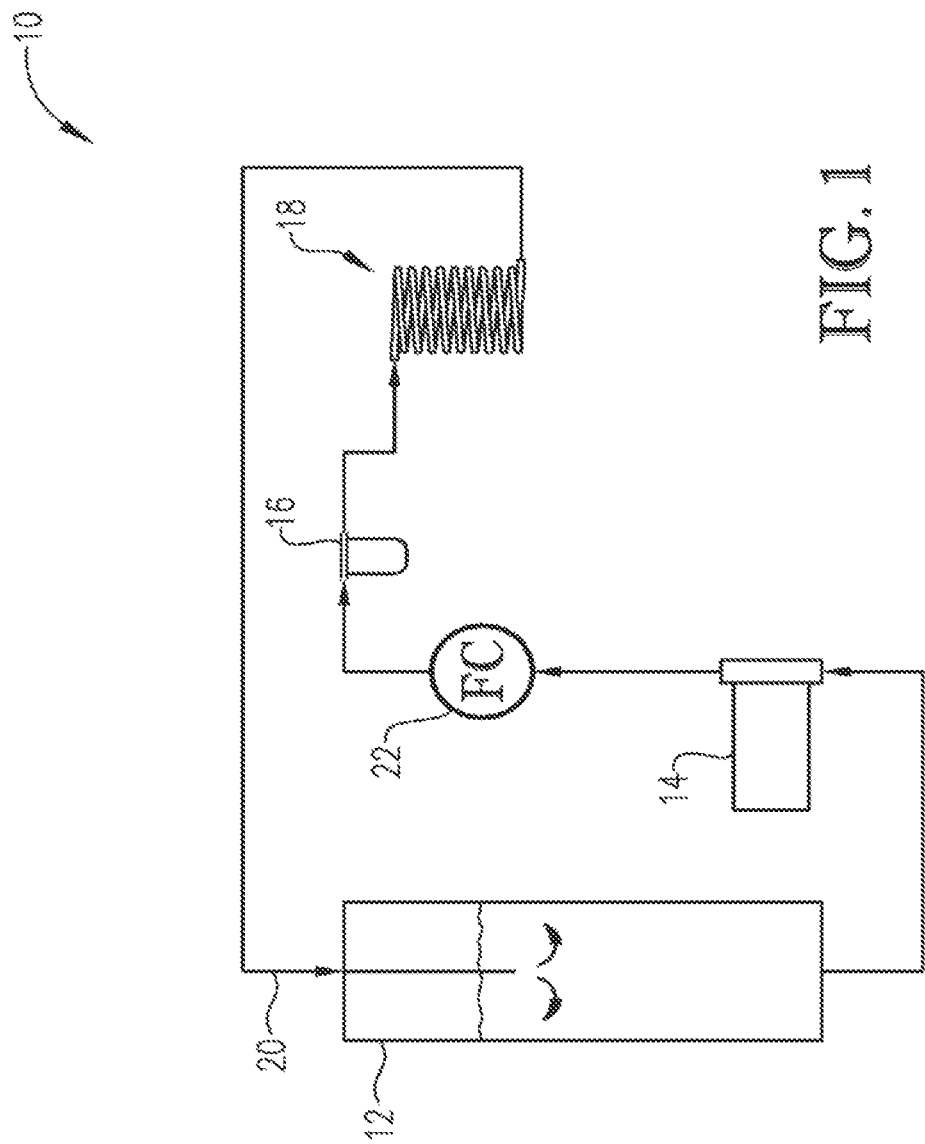
FIG. 1 is a schematic diagram of a test apparatus for determining the pumping stability of various flow improvers.

According to one embodiment of the present invention, a composition capable of reducing pressure drop associated with turbulent fluid flow through a conduit (i.e., a flow improving composition or flow improver) is provided. The flow improver can comprise a latex composition including a plurality of solid particles dispersed in a liquid continuous phase (i.e., a latex flow improver). In one embodiment, the dispersed solids can comprise core-shell particles formed via a two-step emulsion polymerization process described in detail below. The resulting core-shell latex flow improver can have a greater pumping stability than conventional latex flow improvers.

The first step in producing core-shell latex flow improvers according to one embodiment of the present invention is to synthesize the cores of the polymeric particles (i.e., the core particles) via a first emulsion polymerization step. Generally, the first emulsion polymerization step involves polymerizing one or more monomers in a first reaction mixture comprising a liquid continuous phase, at least one emulsion stabilizer, an initiation system, and, optionally, a buffer and/or a hydrate inhibitor.

The monomer(s) employed in the first emulsion polymerization step form core particles comprising repeating units of the monomer(s) residues. In one embodiment, the monomer(s) employed in the first emulsion polymerization step includes one or more monomers selected from the group consisting of:

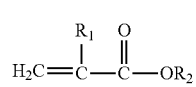
(A)

wherein $R_1$ is H or a $C_1$-$C_{10}$ alkyl radical, and $R_2$ is H, a $C_1$-$C_{30}$ alkyl radical, a $C_5$-$C_{30}$ substituted or unsubstituted cycloalkyl radical, a $C_6$-$C_{20}$ substituted or unsubstituted aryl radical, an aryl-substituted $C_1$-$C_{10}$ alkyl radical, a —$(CH_2CH_2O)_x$—$R_A$ or —$(CH_2CH(CH_3)O)_x$—$R_A$ radical wherein x is in the range of from 1 to 50 and $R_A$ is H, a $C_1$-$C_{30}$ alkyl radical, or a $C_6$-$C_{30}$ alkylaryl radical;

(B) $R_3$-arene-$R_4$ wherein arene is a phenyl, naphthyl, anthracenyl, or phenanthrenyl, $R_3$ is CH=$CH_2$ or $CH_3$—C=$CH_2$, and $R_4$ is H, a $C_1$-$C_{30}$ alkyl radical, a $C_5$-$C_{30}$ substituted or unsubstituted cycloalkyl radical, Cl, $SO_3$, $OR_B$, or $COOR_C$, wherein $R_B$ is H, a $C_1$-$C_{30}$ alkyl radical, a $C_5$-$C_{30}$ substituted or unsubstituted cycloalkyl radical, a $C_6$-$C_{20}$ substituted or unsubstituted aryl radical, or an aryl-substituted $C_1$-$C_{10}$ alkyl radical, and wherein $R_C$ is H, a $C_1$-$C_{30}$ alkyl radical, a $C_5$-$C_{30}$ substituted or unsubstituted cycloalkyl radical, a $C_6$-$C_{20}$ substituted or unsubstituted aryl radical, or an aryl-substituted $C_1$-$C_{10}$ alkyl radical;

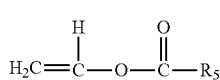
(C)

wherein $R_5$ is H, a $C_1$-$C_{30}$ alkyl radical, or a $C_6$-$C_{20}$ substituted or unsubstituted aryl radical;

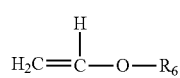
(D)

wherein $R_6$ is H, a $C_1$-$C_{30}$ alkyl radical, or a $C_6$-$C_{20}$ substituted or unsubstituted aryl radical;

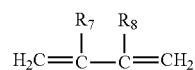
(E)

wherein $R_7$ is H or a $C_1$-$C_{18}$ alkyl radical, and $R_8$ is H, a $C_1$-$C_{18}$ alkyl radical, or Cl;

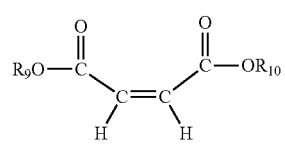
(F)

wherein $R_9$ and $R_{10}$ are independently H, a $C_1$-$C_{30}$ alkyl radical, a $C_6$-$C_{20}$ substituted or unsubstituted aryl radical, a $C_5$-$C_{30}$ substituted or unsubstituted cycloalkyl radical, or heterocyclic radicals;

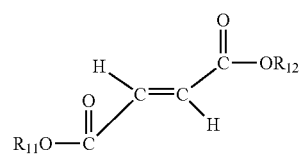
(G)

wherein $R_{11}$ and $R_{12}$ are independently H, a $C_1$-$C_{30}$ alkyl radical, a $C_6$-$C_{20}$ substituted or unsubstituted aryl radical, a $C_5$-$C_{30}$ substituted or unsubstituted cycloalkyl radical, or heterocyclic radicals;

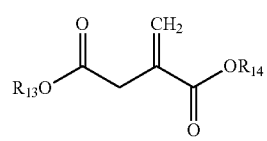
(H)

wherein $R_{13}$ and $R_{14}$ are independently H, a $C_1$-$C_{30}$ alkyl radical, a $C_6$-$C_{20}$ substituted or unsubstituted aryl radical, a $C_5$-$C_{30}$ substituted or unsubstituted cycloalkyl radical, or heterocyclic radicals;

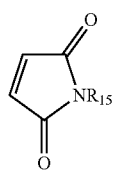
(I)

wherein $R_{15}$ is H, a $C_1$-$C_{30}$ alkyl radical, a $C_6$-$C_{20}$ substituted or unsubstituted aryl radical, a $C_5$-$C_{30}$ substituted or unsubstituted cycloalkyl radical, or heterocyclic radicals;

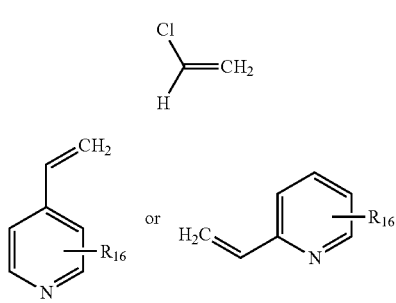

wherein $R_{16}$ is H, a $C_1$-$C_{30}$ alkyl radical, or a $C_6$-$C_{20}$ aryl radical;

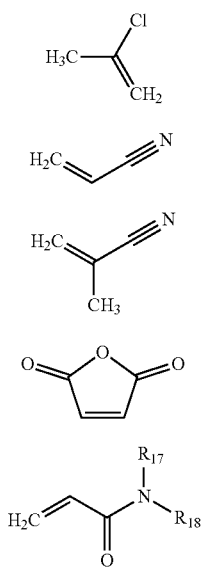

wherein $R_{17}$ and $R_{18}$ are independently H, a $C_1$-$C_{30}$ alkyl radical, a $C_6$-$C_{20}$ substituted or unsubstituted aryl radical, a $C_5$-$C_{30}$ substituted or unsubstituted cycloalkyl radical, or heterocyclic radicals; and

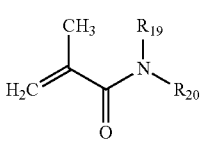

wherein $R_{19}$ and $R_{20}$ are independently H, a $C_1$-$C_{30}$ alkyl radical, a $C_6$-$C_{20}$ substituted or unsubstituted aryl radical, a $C_5$-$C_{30}$ substituted or unsubstituted cycloalkyl radical, or heterocyclic radicals.

In one embodiment, an acrylate or methacrylate monomer (e.g., 2-ethylhexyl methacrylate) can be employed as the monomer(s) of the first emulsion polymerization step. Further, the monomer(s) employed can exclude alpha olefins (i.e., the monomer(s) can be all non-alpha-olefin(s)."). Generally, the first reaction mixture of the first polymerization step can comprise the monomer(s) in an amount in the range of from about 10 to about 60, about 20 to about 55, or 30 to 50 weight percent.

The liquid continuous phase of the first reaction mixture can comprise a polar liquid. Examples of polar liquids can include, but are not limited to, water, organic liquids such as alcohols and diols, and mixtures thereof. According to one embodiment, the first reaction mixture can comprise the liquid continuous phase in an amount in the range of from about 20 to about 80, about 35 to about 75, or 50 to 70 weight percent.

The emulsion stabilizing compound(s) (i.e., emulsion stabilizer) can be added to the first reaction mixture so that the first reaction mixture comprises in the range of from about 0.1 to about 10, about 0.25 to about 6, or 0.5 to 4 weight percent of an emulsion stabilizer. In one embodiment, the emulsion stabilizer can comprise a surfactant. In general, surfactants suitable for use in the reaction mixture of the first emulsion polymerization step can include at least one high HLB anionic or non-ionic surfactant. The term "HLB number" refers to the hydrophile-lipophile balance of a surfactant in an emulsion. The HLB number is determined by the methods described by W. C. Griffin in J. Soc. Cosmet. Chem., 1, 311 (1949) and J. Soc. Cosmet. Chem., 5, 249 (1954), which are incorporated herein by reference. In one embodiment, the HLB number of surfactants for use with forming the reaction mixture for the first polymerization step can be at least about 8, at least about 10, or at least 12.

Exemplary high HLB anionic surfactants include, but are not limited to, high HLB alkyl sulfates, alkyl ether sulfates, dialkyl sulfosuccinates, alkyl phosphates, alkyl aryl sulfonates, and sarcosinates. Suitable examples of commercially available high HLB anionic surfactants include, but are not limited to, sodium lauryl sulfate (available as RHODAPON LSB from Rhodia Incorporated, Cranbury, N.J.), dioctyl sodium sulfosuccinate (available as AEROSOL® OT from Cytec Industries, Inc., West Paterson, N.J.), 2-ethylhexyl polyphosphate sodium salt (available from Jarchem Industries Inc., Newark, N.J.), sodium dodecylbenzene sulfonate (available as NORFOX® 40 from Norman, Fox & Co., Vernon, Calif.), and sodium lauroylsarcosinic (available as HAMPOSYL L-30 from Hampshire Chemical Corp., Lexington, Mass.).

Exemplary high HLB non-ionic surfactants include, but are not limited to, high HLB sorbitan esters, PEG fatty acid esters, ethoxylated glycerine esters, ethoxylated fatty amines, ethoxylated sorbitan esters, block ethylene oxide/propylene oxide surfactants, alcohol/fatty acid esters, ethoxylated alcohols, ethoxylated fatty acids, alkoxylated castor oils, glycerine esters, linear alcohol ethoxylates, and alkyl phenol ethoxylates. Suitable examples of commercially available high HLB non-ionic surfactants include, but are not limited to, nonylphenoxy and octylphenoxy poly(ethyleneoxy) ethanols (available as the IGEPAL® CA and CO series, respectively from Rhodia, Cranbury, N.J.), $C_8$ to $C_{18}$ ethoxylated primary alcohols (such as RHODASURF® LA-9 from Rhodia Inc., Cranbury, N.J.), $C_{11}$ to $C_{15}$ secondary-alcohol ethoxylates (available as the TERGITOL™ 15-S series, including 15-S-7, 15-S-9, 15-S-12, from Dow Chemical Company, Midland, Mich.), polyoxyethylene sorbitan fatty acid esters (available as the TWEEN® series of surfactants from Uniquema, Wilmington, Del.), polyethylene oxide (25) oleyl ether (available as SIPONIC™ Y-500-70 from American Alcolac Chemical Co., Baltimore, Md.), alkylaryl polyether alcohols (available as the TRITON™ X series, including X-100, X-165, X-305, and X-405, from Dow Chemical Company, Midland, Mich.).

The initiation system utilized in the first reaction mixture can be any suitable system for generating free radicals necessary to facilitate emulsion polymerization. The initiator can be added in an amount such that the molar ratio of monomer(s) to initiator in the first reaction mixture is in the range of from about 1,000:1 to about 5,000,000:1, about 2,500:1 to about 2,500,000:1, or 5,000:1 to 2,000,000:1. Examples of possible initiators include, but are not limited to, persulfates (e.g., ammonium persulfate, sodium persulfate, potassium persulfate), peroxy persulfates, and peroxides (e.g., tert-butyl hydroperoxide).

Optionally, the initiation system can comprise one or more reducing components and/or one or more accelerators. In one embodiment, the first reaction mixture can have a molar ratio of monomer(s) to reducing component in the range of from about 1,000:1 to about 5,000,000:1, about 2,500:1 to about 2,500,000:1, or 5,000:1 to 2,000,000:1. Examples of reducing components can include, but are not limited to, bisulfites, metabisulfites, ascorbic acid, erythorbic acid, and sodium formaldehyde sulfoxylate. In another embodiment, an accelerator can be added to achieve an accelerator to initiator molar ratio in the range of from about 0.001:1 to about 10:1, about 0.0025:1 to about 5:1, or 0.005:1 to 1:1. Examples of accelerators can include, but are not limited to, compositions containing a transition metal having two oxidation states such as, for example, ferrous sulfate and ferrous ammonium sulfate. Alternatively, thermal and radiation initiation techniques can be employed to generate the free radicals. If a polymerization technique other than emulsion polymerization is utilized, the initiation and/or catalytic methods corresponding to the selected polymerization technique may also be employed. For example, addition or condensation polymerization is performed, the polymerization can be initiated or catalyzed by cationic, anionic, or coordination type methods.

Optionally, the first reaction mixture can include at least one hydrate inhibitor. The hydrate inhibitor can comprise a thermodynamic hydrate inhibitor. Alcohols and polyols are two examples of hydrate inhibitors. In one embodiment, the hydrate inhibitor can comprise one or more polyhydric alcohols and/or one or more ethers of polyhydric alcohols. Examples of suitable hydrate inhibitors can include but are not limited to, monoethylene glycol, diethylene glycol, triethylene glycol, monopropylene glycol, dipropylene glycol, ethylene glycol monomethyl ether, diethylene glycol monomethyl ether, propylene glycol monomethyl ether, dipropylene glycol monomethyl ether, and mixtures thereof. If a hydrate inhibitor is employed, the first reaction mixture can have a hydrate inhibitor-to-water weight ratio in the range of from about 1:10 to about 10:1, about 1:5 to about 5:1, or 2:3 to 3:2.

According to one embodiment of the present invention, the monomer(s), liquid continuous phase, emulsion stabilizer(s), and hydrate inhibitor (if present) can be combined under a substantially oxygen-free atmosphere comprising less than about 1,000 parts per million by weight (ppmw), less than about 500 ppmw, or less than 100 ppmw of oxygen prior to initiating polymerization. The oxygen-free atmosphere can be maintained by continuously purging the reaction vessel with an inert gas such as nitrogen and/or argon. Generally, the reactor system can be operated at a temperature ranging from about the freezing point of the reaction mixture to about 60° C., about 0 to about 45° C., or 1 to 30° C. and a pressure in the range of from about 5 to about 100 pounds per square inch, absolute (psia), about 10 to about 25 psia, or at about atmospheric pressure. However, pressures up to and exceeding about 300 psia may be required to polymerize certain monomers, such as, for example, diolefins.

In order to initiate polymerization, the pH of the first reaction mixture can be in the range of from about 5 to about 11, about 6 to about 10.5, or 6.5 to 10. If necessary, a buffer solution can be added to the first reaction mixture prior to the introduction of the initiation system to achieve and/or maintain the desired reaction pH. Typically, the type of buffer added to the first reaction mixture can be selected according to its compatibility with the chosen initiation system. Examples of buffers can include, but are not limited to, carbonate, phosphate, and/or borate buffers.

To initiate polymerization, the initiation system described above can be added to the reactor via a single injection or over a time period of at least about 15 minutes, or in the range of from about 20 minutes to about 5 hours or 30 minutes to 2.5 hours. As the reaction is carried out, the reactor contents can be continuously stirred and the polymerization can continue for a period of time sufficient to convert at least about 90 weight percent of the monomers in the reaction mixture. Typically, the first polymerization step can be carried out for a period of time in the range of from about 1 to about 10 hours, about 2 to about 8 hours, or 3 to 5 hours.

The first emulsion polymerization step yields a latex composition comprising a plurality of solid particles dispersed in a liquid continuous phase. In general, the latex can comprise the solid particles in an amount in the range of from about 10 to about 60 weight percent, about 15 to about 55, or 20 to 50 weight percent. The liquid continuous phase of the latex composition can comprise water, emulsion stabilizer(s), hydrate inhibitor (if present), and/or buffer (if present). Typically, the latex can comprise water in an amount in the range of from about 10 to about 80, about 35 to about 75, or 40 to 60 weight percent, and the emulsion stabilizer in an amount in the range of from about 0.1 to about 10, about 0.25 to about 8, or 0.5 to 6 weight percent.

In one embodiment of the present invention, the latex particles of the latex composition resulting from the first emulsion polymerization step can be subsequently used as core particles of a yet-to-be-described second latex composition comprising core-shell particles (i.e., a core-shell latex composition). In one embodiment, the core particles can comprise a drag reducing polymer. In another embodiment, the core particles can comprise a non-polyalphaolefin drag reducing polymer. Additionally, the core particles can comprise repeating units of the residues of $C_4$-$C_{20}$ alkyl, $C_6$-$C_{20}$ substituted or unsubstituted aryl, or aryl-substituted $C_1$-$C_{10}$ alkyl ester derivatives of methacrylic or acrylic acid. In another embodiment, the core particles can comprise a copolymer having repeating units of the residues of 2-ethylhexyl methacrylate and the residues of at least one other monomer. In yet another embodiment, the core particles can comprise a copolymer having repeating units of the residues of 2-ethylhexyl methacrylate monomers and butyl acrylate monomers. In still another embodiment, the core particles can comprise a homopolymer having repeating units of residues of 2-ethylhexyl methacrylate (EHMA).

In one embodiment of the present invention, the core particles can be formed of a drag reducing polymer having a weight average molecular weight ($M_w$) of at least about $5 \times 10^6$ g/mol, at least about $1 \times 10^7$ g/mol, or at least $2 \times 10^7$ g/mol. The core particles can have a mean particle size of less than about 10 microns, less than about 1,000 nm (1 micron), in the range of from about 10 to about 500 nm, or in the range of from 50 to 250 nm. In one embodiment, at least about 95 weight percent of the core particles can have a particle size in the range of from about 10 nm to about 500 nm and at least about 95 weight percent of the particles can have a particle size in the range of from about 25 nm to about 250 nm.

In accordance with one embodiment of the present invention, at least a portion or substantially all of the first latex composition can be exposed to a second polymerization step to thereby produce a core-shell latex composition. According to one embodiment of the present invention, the second polymerization step comprises emulsion polymerization and does not include interfacial polymerization, suspension polymerization, and/or rotating disk polymerization or complex coacervation processes. Typically, the second emulsion polymerization step can be carried out by copolymerizing one or more hydrophobic monomers and one or more amphiphilic compounds in the presence of an initiation system to thereby form a shell copolymer. The shell copolymer can form shells that at least partly surround or entirely surround at least a portion of the individual core latex particles formed in the first polymerization step to thereby produce a plurality of core-shell latex particles.

In general, the hydrophobic monomer(s) utilized in the second emulsion polymerization step can include hydrophobic monomers having a weight average molecular weight in the range of from about 50 to about 400, about 100 to about 350, or 150 to 310 grams per mole (g/mole). One or more of the monomers (A)-(Q) previously discussed with reference to the first emulsion polymerization step can be employed as the hydrophobic monomer to form the shell copolymer in the second emulsion polymerization step. In one embodiment, the hydrophobic monomer is an acrylate and/or methacrylate monomer, such as, for example, 2-ethylhexyl methacrylate.

Generally, the amphiphilic compound(s) utilized in the second emulsion polymerization step can have a weight average molecular weight of at least about 100 g/mole or in the range of from about 200 to about 5,000, or 300 to 2,500 g/mole. In one embodiment, the amphiphilic compounds can comprise one or more surfactants having an HLB number in the range of from about 6 to about 19, about 9 to about 17, or 11 to 16. In addition, the one or more surfactants utilized in the second polymerization step can comprise an ionic and/or a non-ionic polymerizable surfactant. In one embodiment, the second emulsion polymerization step can be carried out in the presence of at least one ionic polymerizable surfactant and at least one non-ionic polymerizable surfactant. Examples of suitable surfactants can include, but are not limited to, polyethylene glycol methacrylate (available as the Blemmer® PE and PEG series of surfactants from Nippon Oil & Fats Co., Ltd., Tokyo, Japan), propylene glycol methacrylate (available as the Blemmer® PP series of surfactants from Nippon Oil & Fats Co., Ltd., Tokyo, Japan), styrene sulfonic acid sodium salt, 2-acrylamidoglycolic acid (available from Sigma-Aldrich Corp., St. Louis, Mo.), (acrylamidomethul) cellulose acetate propionate, ionized or non-ionized 2-acrylamido-2-methyl-1-propanesulfonic acid (available as the AMPS® monomer series from Lubrizol Advanced Materials Inc., Wickliffe, Ohio), 3-sulfopropyl acrylate potassium salt (available from Taiwan Hopax Chemical Manufacturing Co., Kaohsiung, Taiwan), 3-sulfopropyl methacrylate potassium salt, ionized or non-ionized methacrylic acid, and ionized or non-ionized acrylic acid (each available from Sigma-Aldrich Corp., St. Louis, Mo.).

The initiation system utilized in the second emulsion polymerization step can comprise any of the previously-discussed initiators, including, for example, persulfates (e.g., ammonium persulfate, sodium persulfate, and potassium persulfate), peroxy persulfates, and peroxides (e.g., tert-butyl hydroperoxide). Optionally, the reaction mixture of the second polymerization step can also include one or more accelerators and/or reducing components according to the ratios discussed above.

As discussed previously, in one embodiment, the second polymerization step can be initiated by first charging a reactor with at least a portion or substantially all of the first latex composition isolated from the reactor of the first polymerization step and stored for a period of time before performing the second polymerization step. Alternatively, at least a portion or substantially all of the first latex composition can remain in the reactor and the second polymerization step can be carried out immediately after the first polymerization step in the same reaction vessel.

According to one embodiment of the present invention, the latex composition charged to the reactor can be agitated and purged with an inert gas (e.g., nitrogen) to create a substantially oxygen-free environment. The latex composition can then be heated to a temperature greater than about 50° C., or in the range of from about 60 to about 110° C., or 75 to 95° C. prior to adding the initiation system, monomer(s), and amphiphilic compound(s). In one embodiment, the second emulsion polymerization step can be carried out in a semi-continuous manner under monomer-starved conditions by adding the total volume of one or more of the above-described reactant(s) over a time period of at least about 10 minutes, at least about 15 minutes, at least about 30 minutes, at least about 1 hour, or at least 2 hours.

Typically, the second reaction mixture can be continuously agitated during polymerization so that the reaction takes place under high shear conditions. In general, the second polymerization step can be continued long enough that at least about 80, at least about 90, or at least 95 weight percent of the monomer(s) have been polymerized.

In one embodiment, the resulting shell copolymer can comprise repeat units of the monomer(s) in an amount in the range of from about 25 to about 98, about 50 to about 95, or 70 to 90 weight percent, based on the total weight of the resulting shell copolymer. In one embodiment wherein non-ionic and ionic polymerizable surfactants are used, the resulting shell copolymer can comprise repeat units of the non-ionic polymerizable surfactant in an amount in the range of from about 2 to about 50, about 4 to about 40, or 8 to 25 weight percent and can comprise repeat units of the ionic polymerizable surfactant in an amount in the range of from about 0.05 to about 30, about 1 to about 20, or 2 to 15 weight percent, based on the total weight of the shell copolymer. The weight ratio of repeat units of the monomer(s) to repeat units of the non-ionic polymerizable surfactant in the shell copolymer can be in the range of from about 0.5:1 to about 40:1, about 1:1 to about 20:1, or 2:1 to 10:1 and the weight ratio of the monomer repeat units to the repeat units of the ionic polymerizable surfactant can be in the range of from about 1:1 to about 100:1, about 3:1 to about 50:1, or 5:1 to 30:1. In one embodiment, the weight ratio of the repeat units of the non-ionic polymerizable surfactant to the repeat units of the ionic polymerizable surfactant in the shell copolymer can be in the range of from about 0.25:1 to about 30:1, about 0.75:1 to about 10:1, or 1.5:1 to 6:1.

The second emulsion polymerization step can yield a latex composition comprising a plurality of solid core-shell particles dispersed a liquid continuous phase. In general, the latex can comprise the particles in an amount in the range of from about 10 to about 60 weight percent, about 15 to about 55, or 20 to 50 weight percent. The liquid continuous phase of the latex composition can comprise water, emulsion stabilizer(s), and hydrate inhibitor (if present), and/or buffer (if present). Typically, the latex can comprise water in an amount in the range of from about 10 to about 80, about 35 to about 75, or 40 to 60 weight percent, and the emulsion stabilizer(s) in an amount in the range of from about 0.1 to about 10, about 0.25 to about 8, or 0.5 to 6 weight percent. In one embodiment, the liquid continuous phase can comprise a mixture of water and ethylene glycol and/or propylene glycol. Generally, the latex composition can have a viscosity of less than about 1,000 centipoise (cp), or in the range of from about 1 to about 100 or 2 to 700 cp, measured at a shear rate of 511 $sec^{-1}$ and a temperature of 75° F.

According to one embodiment, at least a portion of the shells of the dispersed particles of the latex composition produced during the second emulsion polymerization step can at least partly or entirely surround at least a portion of the core particles without being chemically or physically bound to the cores. In one embodiment, the shell copolymer can be a non-drag-reducing copolymer.

Typically, the core-shell particles can have a mean particle size of less than about 10 microns, less than about 1,000 nm (1 micron), in the range of from about 10 to about 750 nm, or in the range of from 50 to 250 nm. In one embodiment, at least about 90 weight percent of the core-shell particles have a particle size greater than 25 nanometers and/or less than 500 nanometers. According to one embodiment, the core-shell particles can have an average weight ratio of the core to the shell in the range of from about 1.5:1 to about 30:1, about 2:1 to about 20:1, or 4:1 to 15:1. In general, the shell constitutes in the range of from about 2 to about 40, about 5 to about 30, or 10 to 25 weight percent of the total weight of the core-shell particle and can have an average thickness in the range of from about 0.1 to about 20, about 0.5 to about 15, or 1 to 10 percent of the mean particle diameter of the total core-shell particle. Typically, the average shell thickness can be in the range of from about 0.5 to about 30, about 1 to about 20, or 2 to 15 nm.

In one embodiment of the present invention, the above-described core-shell flow improving composition can be added to a hydrocarbon-containing fluid flowing through a fluid conduit. In one embodiment, the hydrocarbon-containing fluid can comprise crude oil, gasoline, diesel, and/or other refined products. The flow improver can be added to the fluid conduit via one or more injection pumps at one or more locations along the length of the conduit. In one embodiment, the injection pump can have a discharge pressure greater than about 500 psig, or in the range of from about 600 to about 2,500 psig, or 750 to 1,500 psig.

Typically, the amount of flow improver added to the treated hydrocarbon-containing fluid is such that the fluid can experience a drag reduction of at least about 5 percent, at least about 10 percent, or at least 15 percent compared to the untreated fluid. In one embodiment, the cumulative concentration of the drag reducing core polymer in the treated fluid can be in the range of from about 0.1 to about 500 ppmw, about 0.5 to about 200 ppmw, about 1 to about 100 ppmw, or 2 to 50 ppmw. Typically, at least about 50 weight percent, at least about 75 weight percent, or at least 95 weight percent of the core-shell particles of the flow-improving composition can be dissolved by the hydrocarbon-containing fluid.

The following examples are intended to be illustrative of the present invention in order to teach one of ordinary skill in the art to make and use the invention and are not intended to limit the scope of the invention in any way.

EXAMPLES

Test Method

In the Examples that follow, the test method described below was used for determining the pumping stability of latex flow improving compositions. FIG. 1 depicts a test apparatus 10 used for the pumping stability tests.

The pumping stability test were initiated by gravity feeding a latex flow improver from a 165-gallon feed tank 12 into the suction of a Milton Roy C High Performance Diaphragm (HPD) Metering pump 14 (available from Milton Roy USA in Ivyland, Pa.). The flow improver was filtered with a 100-micron filter 16 and then pumped at a rate corresponding to 50 percent stroke length through 3000 feet of ½ inch diameter (0.049 inch wall thickness) stainless steel coiled tubing 18 prior to reentering feed tank 12 via return line 20, as shown in FIG. 1. To minimize product foaming, the outlet of return line 20 was positioned below the liquid level in feed tank 12. The mass flow rate of the circulating flow improver was monitored via an Endress+ Hauser Coriolis flow meter 22 (available from Endress+ Hauser, Inc. in Greenwood, Ind.) and graphically recorded over the duration of the experiment. The flow improver was allowed to circulate continuously through test apparatus 10 for a period of 6 weeks or until pump failure occurred. Upon conclusion of the test, apparatus 10 was dismantled and pump 14, filter 16, and coiled tubing 18 were visually inspected and the observations were documented.

Example 1

Synthesis of a Comparative Latex Flow Improver

Latex Flow Improver A (comparative) was prepared by emulsion polymerization according to the following procedure.

Polymerization was performed in a 185-gallon stainless steel, jacketed reactor with a mechanical stirrer, thermocouple, feed ports, and nitrogen inlets/outlets. The reactor was charged with 440 lbs of monomer (2-ethylhexyl methacrylate), 288.9 lbs of de-ionized water, 279.0 lbs of monoethylene glycol, 41.4 lbs of Polystep® B-5 (surfactant, available from Stepan Company of Northfield, Ill), 44 lbs of Tergitol™ 15-S-7 (surfactant, available from Dow Chemical Company of Midland, Mich.), 1.24 lbs of potassium phosphate monobasic (pH buffer), 0.97 lbs of potassium phosphate dibasic (pH buffer), and 33.2 grams of ammonium persulfate, $(NH_4)_2S_2O_8$ (oxidizer).

The monomer, water, and monoethylene glycol mixture was agitated at 110 rpm while being cooled to 41° F. The two surfactants were added and the agitation was slowed down to 80 rpm for the remainder of the reaction. The buffers and the oxidizer were then added. The polymerization reaction was initiated by adding 4.02 grams of ammonium iron (II) sulfate, $Fe(NH_4)_2(SO_4)_2 \cdot 6H_2O$ in a solution of 0.010 M sulfuric acid solution in de-ionized water at a concentration of 1117 ppm at a rate of 5 g/min into the reactor. The solution was injected for 10 hours to complete the polymerization. The resulting latex was pressured out of the reactor through a 5-micron bag filter and stored.

Example 2

Synthesis of an Inventive Latex Flow Improver

Latex Flow Improver B (inventive) was prepared by emulsion polymerization according to the following procedure.

One thousand pounds of Latex Flow Improver A, as prepared according to the procedure of Example 1, was charged into a stainless steel jacketed reactor having a mechanical stirrer, thermocouple, feed ports, and nitrogen inlets and outlets. The flow improver was agitated at a speed of 80 rpm under a constant nitrogen purge while being heated to 176° F. Next, 4011 grams of an aqueous solution comprising 25.21 weight percent ammonium persulfate, $(NH_4)_2S_2O_8$ (an oxidizer) was injected into the reactor and the reactor contents were allowed to stir for 30 minutes. Next, the following three reactants were simultaneously injected into the reactor: (1) an aqueous solution comprising 25.85 weight percent ammonium persulfate; (2) an aqueous solution comprising methoxypolyethylene glycol 500 methacrylate, 13.33 weight percent sodium styrene sulfonate, and 46.67 weight percent de-ionized water; and (3) 2-ethylhexyl methacrylate. Reactant (1) was injected into the reactor at a rate of 20 grams per minute (g/min) for 2.5 hours, reactant (2) was injected at a rate of 113.4 g/min for 2 hours, and reactant stream (3) was injected into the reactor at 215.0 g/min for 2.25 hours. After the injection of reactant (1) was completed, the reactor contents were then held for 30 minutes at 176° F. while agitating at 80 rpm. The resulting latex was then cooled to below 100° F., pressured out of the reactor through a 5-micron bag filter and stored.

Example 3

Pumping Stability Tests

Latex Flow Improver A (comparative) and Latex Flow Improver B (inventive) were subjected to the above-described test method to determine the relative pumping stability of each composition. The results of these experiments are illustrated in FIGS. 2 and 3.

Figure 2:
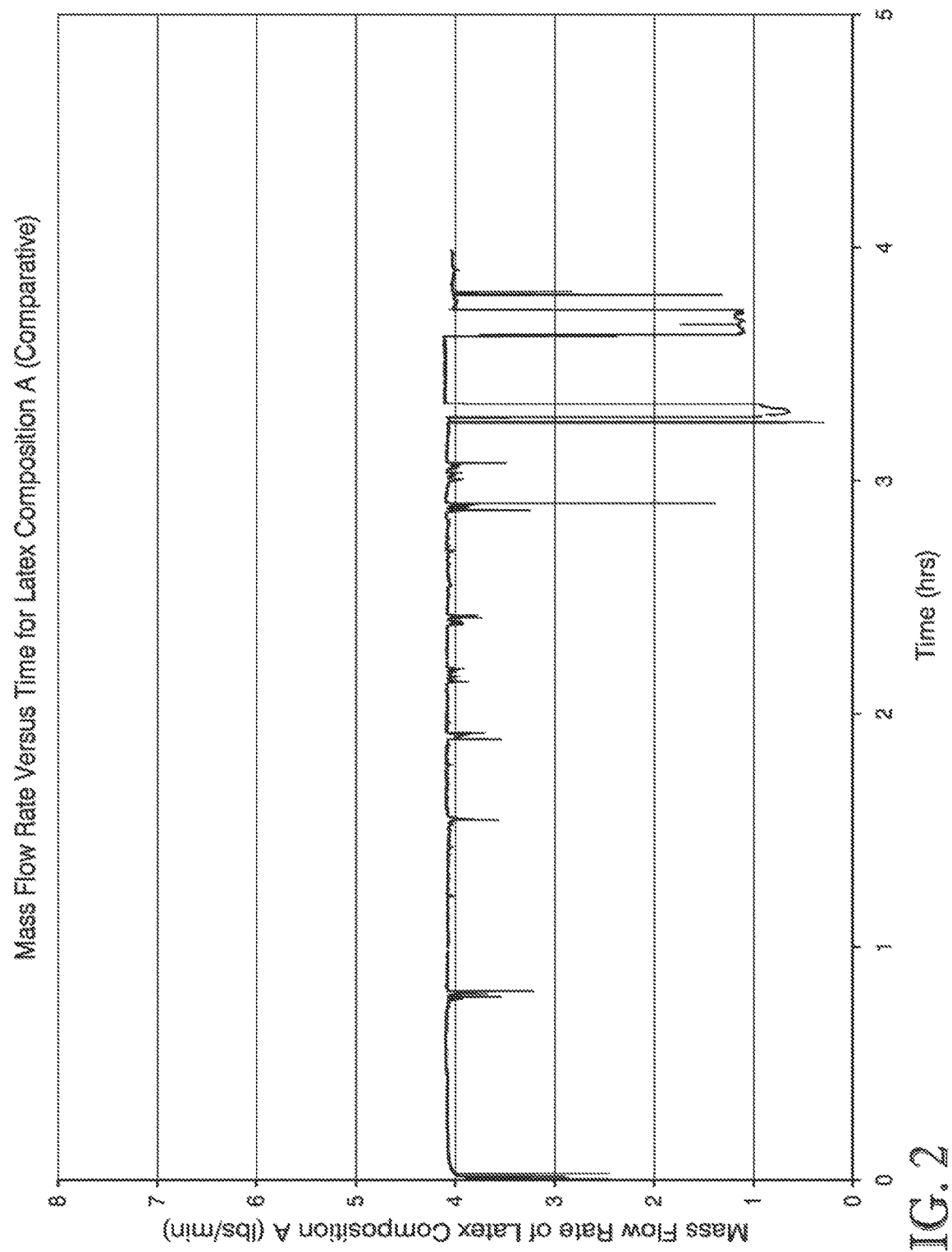
FIG. 2 is a mass flow rate versus time plot resulting from a pumping stability test performed with the apparatus depicted in FIG. 1 using a comparative latex flow improver.

FIG. 2 is a plot of the mass flow rate of Latex Flow Improver A versus time. After less than 4 days, the trial was stopped due to extended periods of erratic, low, or no fluid flow, as shown in FIG. 2. The pump was disassembled and showed considerable build-up of a polymeric film. In addition, large pieces of polymeric material were found in downstream valves and piping.

Figure 3:
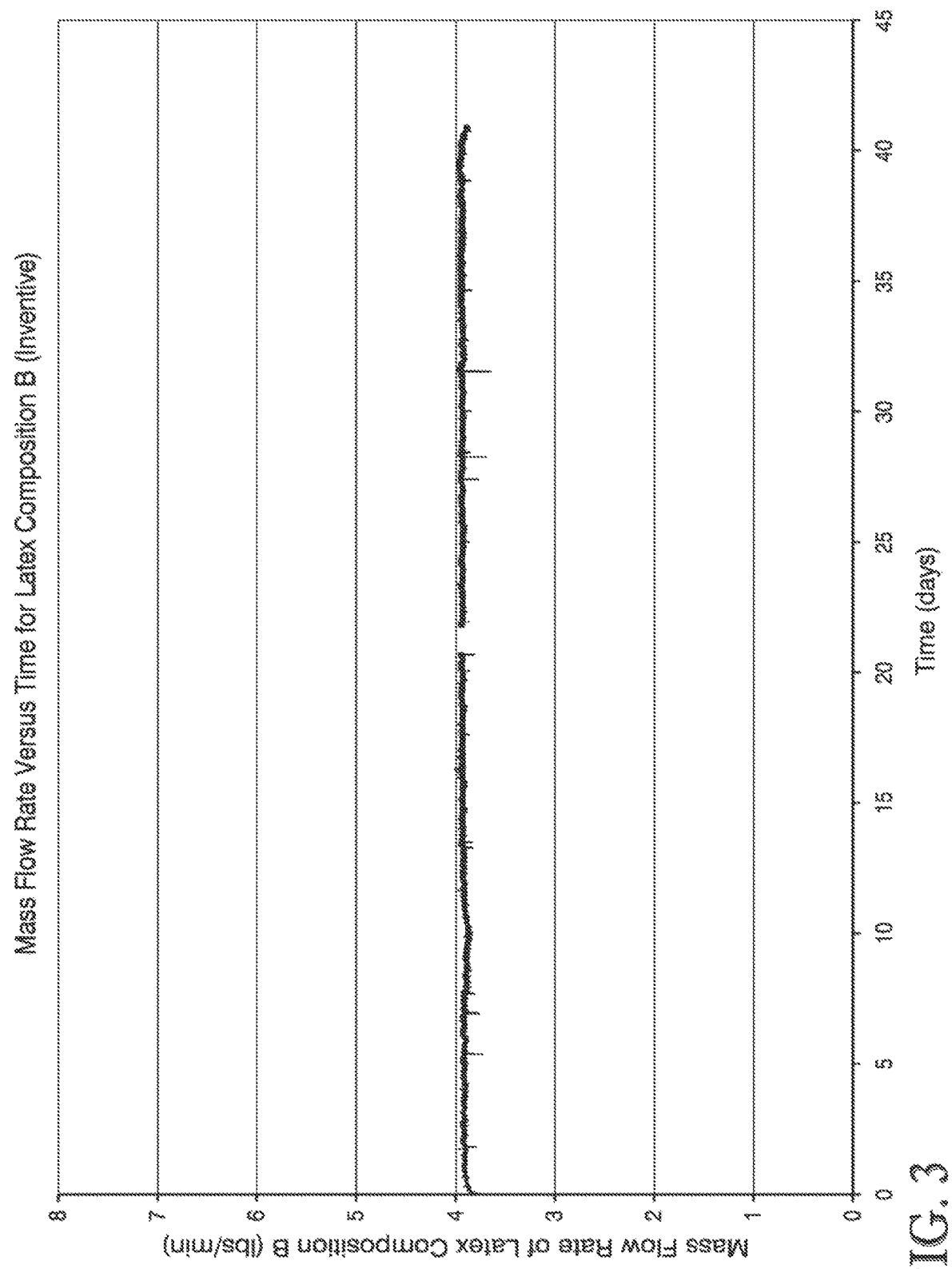
FIG. 3 is a mass flow rate versus time plot resulting from a pumping stability test performed with the apparatus depicted in FIG. 1 using an inventive latex flow improver.

FIG. 3 is a plot of the mass flow rate of Latex Flow Improver B versus time. As shown in FIG. 3, Latex Flow Improver B circulated for a period of 41 days without substantial flow interruption. The test was stopped after 41 days and the equipment (pump and downstream filter, valves, and piping) were disassembled. Upon inspection, the pump showed very little film build-up and no material was found in the pump check valves downstream of the pump discharge.

Thus, as Latex Flow Improver B flowed longer without interruption and showed little evidence of film build up, Latex Flow Improver B demonstrates a higher pumping stability than Latex Flow Improver A.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

Definitions

As used herein, the terms "a," "an," "the," and "said" mean one or more.

As used herein, the term "amphiphilic" refers to a compound having both hydrophobic and hydrophobic moieties.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise" provided above.

As used herein, the terms "including," "includes," and "include" have the same open-ended meaning as "comprising," "comprises," and "comprise" provided above.

As used herein, the terms "having," "has," and "have" have the same open-ended meaning as "comprising," "comprises," and "comprise" provided above. As used herein, the term "drag reducing polymer" refers to a polymer having a weight average molecular weight of at least $5 \times 10^6$ g/mol that, when added to a fluid flowing through a conduit, is effective to reduce pressure loss associated with turbulent flow of the fluid through the conduit.

As used herein, the term "HLB number" refers to the hydrophile-lipophile balance of an amphiphilic compound as determined by the methods described by W. C. Griffin in J. Soc. Cosmet. Chem., 1, 311 (1949) and J. Soc. Cosmet. Chem., 5, 249 (1954).

As used herein, the term "polymer" refers to homopolymers, copolymers, terpolymers of one or more chemical species.

As used herein, the term "polymerizable surfactant" refers to a surfactant having at least one ethylenically unsaturated moiety.

As used herein, the term "turbulent flow" refers to fluid flow having a Reynolds number of at least 2,000.

As used herein, the term "weight average molecular weight" refers to the molecular weight of a polymer calculated according to the following formula: $\Sigma_i(N_iM_i^2)/\Sigma_i(N_iM_i)$, where $N_i$ is the number of molecules of molecular weight $M_i$.

Claims Not Limited to the Disclosed Embodiments

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

The invention claimed is:

1. A process for making a flow improver comprising:
   (a) forming a plurality of core particles of a drag reducing polymer by emulsion polymerization, the drag reducing polymer having a weight average molecular weight ($M_w$) of at least about $5 \times 10^6$ g/mol; and (b) forming a shell around each of the plurality of core particles by emulsion polymerization to thereby produce a plurality of core-shell particles,
wherein the forming of (b) comprises polymerizing one or more shell-forming monomers and at least one polymerizable surfactant so the shell comprises repeat units of the one or more shell-forming monomers and repeat units of the at least one polymerizable surfactant,
wherein a weight ratio of repeat units of the one or more shell-forming monomers and repeat units of the at least one polymerizable surfactant in the shell is in a range of from about 0.5:1 to about 40:1.

2. The process of claim 1, wherein the emulsion polymerization of (a) is carried out in a first reaction mixture comprising a first liquid continuous phase, wherein the emulsion polymerization of (b) is carried out in a second reaction mixture comprising a second liquid continuous phase and at least a portion of the core particles, wherein the second liquid continuous phase comprises at least a portion of the first liquid continuous phase.

3. The process of claim 2, wherein the second liquid continuous phase comprises substantially all of the first liquid continuous phase.

4. The process of claim 1, wherein the one or more shell-forming monomers comprise an acrylate monomer, a methacrylate monomer, or a combination thereof.

5. The process of claim 1, wherein the one or more shell-forming monomers and the at least one polymerizable surfactant do not chemically react with the core particles during the forming of (b).

6. A process for making a flow improver, comprising:
(a) forming a plurality of core particles of a drag reducing polymer by emulsion polymerization; and
(b) forming polymeric shells around at least a portion of the core particles by emulsion polymerization to thereby produce a plurality of core-shell particles,
wherein the polymeric shell is formed around the core particle by emulsion polymerizing at least one hydrophobic monomer and at least one polymerizable surfactant in the presence of the core particle,
wherein the emulsion polymerization carried out to form the polymeric shells comprises using a first non-ionic polymerizable surfactant and a second ionic polymerizable surfactant, wherein the polymeric shells comprise repeat units of the first non-ionic polymerizable surfactant in an amount in the range of from about 2 to about 50 weight percent and repeat units of the second ionic polymerizable surfactant in an amount in the range of from about 0.05 to about 30 weight percent,
wherein the core-shell particles have a mean particle size of less than 10 microns, and
wherein the polymeric shell comprises repeat units of the at least one hydrophobic monomer in an amount in the range of from about 25 to about 98 weight percent.

7. The process of claim 6, wherein the at least one hydrophobic monomer is a methacrylate monomer, an acrylate monomer, or a combination thereof.

8. The process of claim 6, wherein the plurality of core-shell particles have a mean particle size less than about 1 micron, wherein the average thickness of the polymeric shell is in the range of from about 0.5 to about 30 nanometers.

9. The process of claim 6, wherein the at least one hydrophobic monomer is selected from the group consisting of:

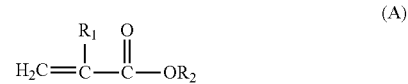
(A)

wherein $R_1$ is H or a $C_1$-$C_{10}$ alkyl radical, and $R_2$ is H, a $C_1$-$C_{30}$ alkyl radical, a $C_5$-$C_{30}$ substituted or unsubstituted cycloalkyl radical, a $C_6$-$C_{20}$ substituted or unsubstituted aryl radical, an aryl-substituted $C_1$-$C_{10}$ alkyl radical, a —$(CH_2CH_2O)_x$—$R_4$ or —$(CH_2CH(CH_3)O)_x$—$R_4$ radical wherein x is in the range of from 1 to 50 and $R_4$ is H, a $C_1$-$C_{30}$ alkyl radical, or a $C_6$-$C_{30}$ alkylaryl radical;

(B) $R_3$-arene-$R_4$ wherein arene is a phenyl, naphthyl, anthracenyl, or phenanthrenyl, $R_3$ is CH=$CH_2$ or $CH_3$—C=$CH_2$, and $R_4$ is H, a $C_1$-$C_{30}$ alkyl radical, a $C_5$-$C_{30}$ substituted or unsubstituted cycloalkyl radical, Cl, $SO_3$, $OR_B$, or $COOR_C$, wherein $R_B$ is H, a $C_1$-$C_{30}$ alkyl radical, a $C_5$-$C_{30}$ substituted or unsubstituted cycloalkyl radical, a $C_6$-$C_{20}$ substituted or unsubstituted aryl radical, or an aryl-substituted $C_1$-$C_{10}$ alkyl radical, and wherein $R_c$ is H, a $C_1$-$C_{30}$ alkyl radical, a $C_5$-$C_{30}$ substituted or unsubstituted cycloalkyl radical, a $C_6$-$C_{20}$ substituted or unsubstituted aryl radical, or an aryl-substituted $C_1$-$C_{10}$ alkyl radical;

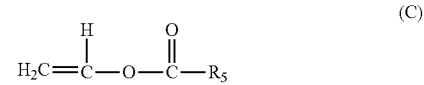
(C)

wherein $R_5$ is H, a $C_1$-$C_{30}$ alkyl radical, or a $C_6$-$C_{20}$ substituted or unsubstituted aryl radical;

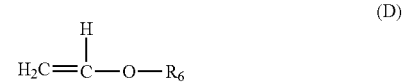
(D)

wherein $R_6$ is H, a $C_1$-$C_{30}$ alkyl radical, or a $C_6$-$C_{20}$ substituted or unsubstituted aryl radical;

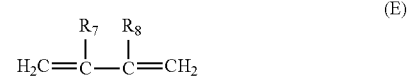
(E)

wherein $R_7$ is H or a $C_1$-$C_1$ alkyl radical, and $R_8$ is H, a $C_1$-$C_{18}$ alkyl radical, or Cl;

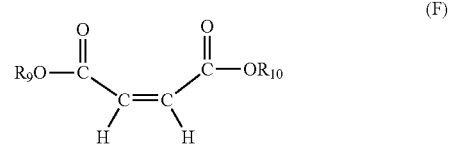
(F)

wherein $R_9$ and $R_{10}$ are independently H, a $C_1$-$C_{30}$ alkyl radical, a $C_6$-$C_{20}$ substituted or unsubstituted aryl radical, a $C_5$-$C_{30}$ substituted or unsubstituted cycloalkyl radical, or heterocyclic radicals;

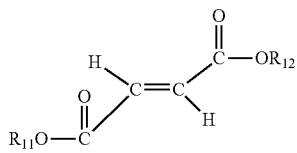
(G)

wherein $R_{11}$ and $R_{12}$ are independently H, a $C_1$-$C_{30}$ alkyl radical, a $C_6$-$C_{20}$ substituted or unsubstituted aryl radical, a $C_5$-$C_{30}$ substituted or unsubstituted cycloalkyl radical, or heterocyclic radicals;

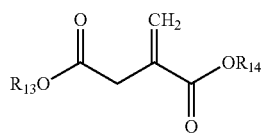
(H)

wherein $R_{13}$ and $R_{14}$ are independently H, a $C_1$-$C_{30}$ alkyl radical, a $C_6$-$C_{20}$ substituted or unsubstituted aryl radical, a $C_5$-$C_{30}$ substituted or unsubstituted cycloalkyl radical, or heterocyclic radicals; and

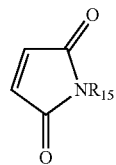
(I)

wherein $R_{15}$ is H, a $C_1$-$C_{30}$ alkyl radical, a $C_6$-$C_{20}$ substituted or unsubstituted aryl radical, a $C_5$-$C_{30}$ substituted or unsubstituted cycloalkyl radical, or heterocyclic radicals.

10. The process of claim 6, wherein the at least one hydrophobic monomer is selected from the group consisting of:

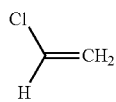
(J)

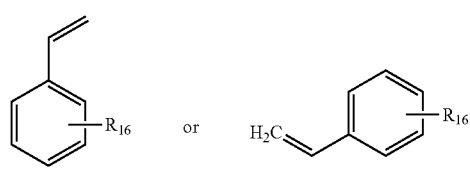
(K)

wherein $R_{16}$ is H, a $C_1$-$C_{30}$ alkyl radical, or a $C_6$-$C_{20}$ aryl radical,

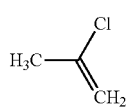
(L)

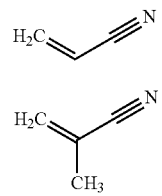
(M)

(N)

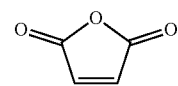
(O)

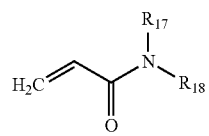
(P)

wherein $R_{17}$ and $R_{18}$ are independently H, a $C_1$-$C_{30}$ alkyl radical, a $C_6$-$C_{20}$ substituted or unsubstituted aryl radical, a $C_5$-$C_{30}$ substituted or unsubstituted cycloalkyl radical, or heterocyclic radicals; and

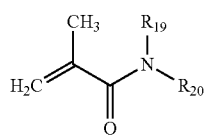
(Q)

wherein $R_{19}$ and $R_{20}$ are independently H, a $C_1$-$C_{30}$ alkyl radical, a $C_6$-$C_{20}$ substituted or unsubstituted aryl radical, a $C_5$-$C_{30}$ substituted or unsubstituted cycloalkyl radical, or heterocyclic radicals.

11. The process of claim 1, wherein the one or more shell-forming monomers comprise repeat units of a hydrophobic monomer.

12. The process of claim 11, wherein the repeat units of the at least one polymerizable surfactant comprise repeat units of a non-ionic polymerizable surfactant, an ionic polymerizable surfactant, or both.

13. The process of claim 12, wherein a weight ratio of repeat units of the non-ionic polymerizable surfactant to repeat units of the ionic polymerizable surfactant in the shell is in the range of from about 0.25:1 to about 30:1.

14. The process of claim 11, wherein the at least one polymerizable surfactant is polyethylene glycol methacrylate and/or the hydrophobic monomer is 2-ethylhexyl methacrylate.

15. A process for reducing pressure loss associated with turbulent flow of a fluid through a conduit, the process comprising:
using a pump to inject a flow improver formed by the process of claim 1 into the fluid flowing through the conduit.

16. A process for reducing pressure loss associated with turbulent flow of a fluid through a conduit, the process comprising:
using a pump to inject a flow improver formed by the process of claim 6 into the fluid flowing through the conduit.

17. A process for making a flow improver comprising:
(a) forming a plurality of core particles of a drag reducing polymer by emulsion polymerization; and (b) forming shells around at least a portion of the core particles by emulsion polymerization to thereby produce a plurality of core-shell particles,
wherein the shells comprise repeat units of a hydrophobic monomer, a non-ionic polymerizable surfactant, and an ionic polymerizable surfactant, wherein the weight ratio of repeat units of the hydrophobic monomer to repeat units of the non-ionic polymerizable surfactant in the shells is in the range of from about 0.5:1 to about 40:1, wherein the weight ratio of repeat units of the non-ionic polymerizable surfactant to repeat units of the ionic polymerizable surfactant in the shells is in the range of from about 0.25:1 to about 30:1.

* * * * *